(No Model.)
R. T. GREENE.
HOOK FOR SUSPENDING LADDERS.
No. 274,758. Patented Mar. 27, 1883.
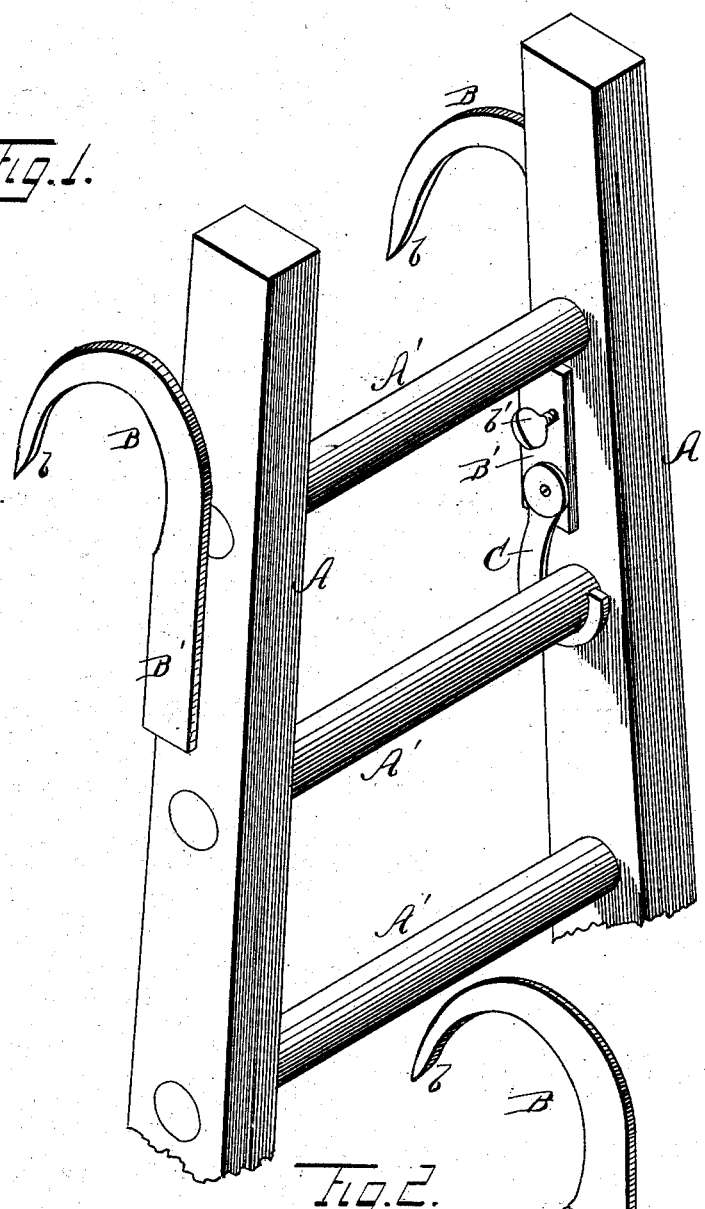
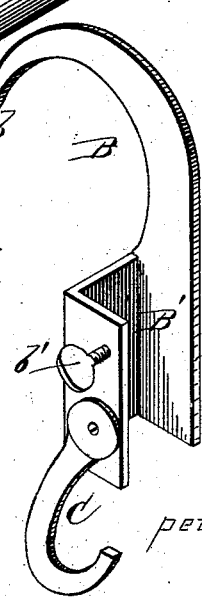

UNITED STATES PATENT OFFICE.

RICHARD T. GREENE, OF SAUK CENTRE, MINNESOTA.

HOOK FOR SUSPENDING LADDERS.

SPECIFICATION forming part of Letters Patent No. 274,758, dated March 27, 1883.

Application filed September 28, 1882. (No model.)

*To all whom it may concern:*

Be it known that I, RICHARD T. GREENE, a citizen of the United States of America, residing at Sauk Centre, in the county of Stearns and State of Minnesota, have invented Improvements in Ladder-Suspending Hooks, of which the following is a full, clear, and exact description, to wit:

This invention relates to devices for suspending ladders from window-sills or similar positions; and it consists in a hook formed with a box or frame on one end, open at one side and each end, and provided with a pivoted hook for attachment to the rounds of a ladder, and a thumb-screw for securing it to the side frame of the same, substantially as and for the purpose hereinafter more fully described.

In order to enable others skilled in the art to which my invention belongs to make and use the same, I will now proceed to describe its construction and operation, referring to the accompanying drawings, in which—

Figure 1 is a perspective view of a ladder having my invention attached thereto, and Fig. 2 is a similar view of one of the hooks.

A represents the side bars, and A' the rounds, of a ladder of the usual shape.

B is a large hook, having a sharp point, $b$, and formed on its lower end with an open box, B', as shown. This box is of proper size to fit and clasp the side bar, A, of the ladder, and on the inside it is provided with a thumb-screw, $b'$, by which it is secured to the ladder. On one side of the box B' is a pivoted hook, C, of a size to engage with the rounds A' and secure the box from slipping.

When one of these hooks is secured to each side bar of a ladder it may easily and quickly be suspended from a window-sill or similar place, and be secure from falling, no matter what weight is applied, as the pivoted hook C, engaging the rounds of the ladder, effectually prevents any slipping of the suspending-hook.

These hooks may be secured to a ladder, either at the ends or at any position between them, and will be found exceedingly handy for painters, carpenters, firemen, and for any use where it is necessary to suspend a ladder from any position.

Having thus fully described my invention, what I claim as new, and desire to secure by Letters Patent, is—

1. An adjustable ladder-suspending hook having an open box at one end, adapted to clasp the side bar of a ladder, provided with a pivoted hook for engaging with a round of the ladder, and an attaching-hook at the opposite end, substantially as shown and described.

2. A ladder-suspending hook consisting of the hook B, formed with an open box, B', on one end, and provided with a thumb-screw, $b'$, and a pivoted hook, C, all constructed and arranged to operate substantially as shown and described.

In testimony whereof I affix my signature in presence of two witnesses.

RICHARD T. GREENE.

Witnesses:
CHARLES A. MORSE,
GEO. C. CAHORN.